US009584435B2

(12) United States Patent
Matczynski et al.

(10) Patent No.: US 9,584,435 B2
(45) Date of Patent: Feb. 28, 2017

(54) GLOBAL CLOUD COMPUTING ENVIRONMENT RESOURCE ALLOCATION WITH LOCAL OPTIMIZATION

(71) Applicant: Verizon Patent and Licensing Inc., Basking Ridge, NJ (US)

(72) Inventors: Michael J. Matczynski, Waltham, MA (US); Paul M. Curtis, Sudbury, MA (US); Owen F. Kellett, Waltham, MA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 216 days.

(21) Appl. No.: 13/959,165

(22) Filed: Aug. 5, 2013

(65) Prior Publication Data
US 2015/0039767 A1 Feb. 5, 2015

(51) Int. Cl.
*H04L 12/911* (2013.01)
*H04W 4/00* (2009.01)
*G06F 9/50* (2006.01)

(52) U.S. Cl.
CPC ............ *H04L 47/70* (2013.01); *G06F 9/5072* (2013.01); *H04W 4/003* (2013.01)

(58) Field of Classification Search
CPC ...... G06F 3/061; G06F 3/0631; G06F 9/5011; G06F 9/5044; G06F 9/45533; G06F 9/45558; G06F 9/5083; G06F 9/5005; G06F 9/5072; G06F 3/067; G06F 8/63; G06F 8/20; G06F 8/70; G06F 21/6218; H04L 67/10; H04L 67/1008; H04L 67/101; H04L 67/1012; H04L 61/20; H04L 47/70; H04L 47/822; H04L 67/827; H04L 41/18; H04L 41/0896; H04L 41/5054; H04W 4/003
See application file for complete search history.

(56) References Cited

U.S. PATENT DOCUMENTS

| | | | | |
|---|---|---|---|---|
| 7,694,054 B2* | 4/2010 | Grewal | ............... | G06F 21/6218 710/240 |
| 8,234,650 B1* | 7/2012 | Eppstein | ............... | G06F 9/5072 709/220 |
| 8,516,488 B1* | 8/2013 | Brown | .............. | G06F 17/30463 707/718 |
| 8,627,326 B2* | 1/2014 | Gebhart | ............... | G06F 9/5044 718/104 |
| 8,990,807 B2* | 3/2015 | Wu | ..................... | G06F 11/3442 718/1 |

(Continued)

*Primary Examiner* — Vivek Srivastava
*Assistant Examiner* — Todd L Barker

(57) ABSTRACT

A device, of a cloud computing environment, receives information associated with one or more computing resources of a local portion of the cloud computing environment, and receives, from a global allocator device, a request for placement of a computing resource element at a selected computing resource of the one or more computing resources. The device also determines, based on the information, whether the request can be satisfied by the selected computing resource, and places the requested computing resource element in the selected computing resource when the request can be satisfied by the selected computing resource. The device sends, to the global allocator device, a message indicating that the requested computing resource element has been successfully placed in the selected computing resource.

20 Claims, 12 Drawing Sheets

(56) References Cited

U.S. PATENT DOCUMENTS

| | | | | |
|---|---|---|---|---|
| 9,158,586 B2* | 10/2015 | Rothschild | .............. | G06F 3/067 |
| 2011/0320606 A1* | 12/2011 | Madduri | ................ | G06F 9/5005 |
| | | | | 709/226 |
| 2012/0173729 A1* | 7/2012 | Lee | ........................ | G06F 9/5044 |
| | | | | 709/226 |
| 2014/0068609 A1* | 3/2014 | Breitgand | ........... | G06F 9/45533 |
| | | | | 718/1 |
| 2014/0244842 A1* | 8/2014 | Rosensweig | .......... | G06F 9/5072 |
| | | | | 709/226 |
| 2014/0282589 A1* | 9/2014 | Kuang | .................. | G06F 9/5016 |
| | | | | 718/104 |
| 2014/0359113 A1* | 12/2014 | Krebs | ................. | H04L 41/5009 |
| | | | | 709/224 |
| 2015/0026346 A1* | 1/2015 | Yoon | .................... | H04L 47/822 |
| | | | | 709/226 |
| 2015/0169291 A1* | 6/2015 | Dube | ........................ | G06F 8/20 |
| | | | | 717/101 |
| 2015/0331707 A1* | 11/2015 | Hellkvist | .................. | G06F 8/63 |
| | | | | 718/1 |

* cited by examiner

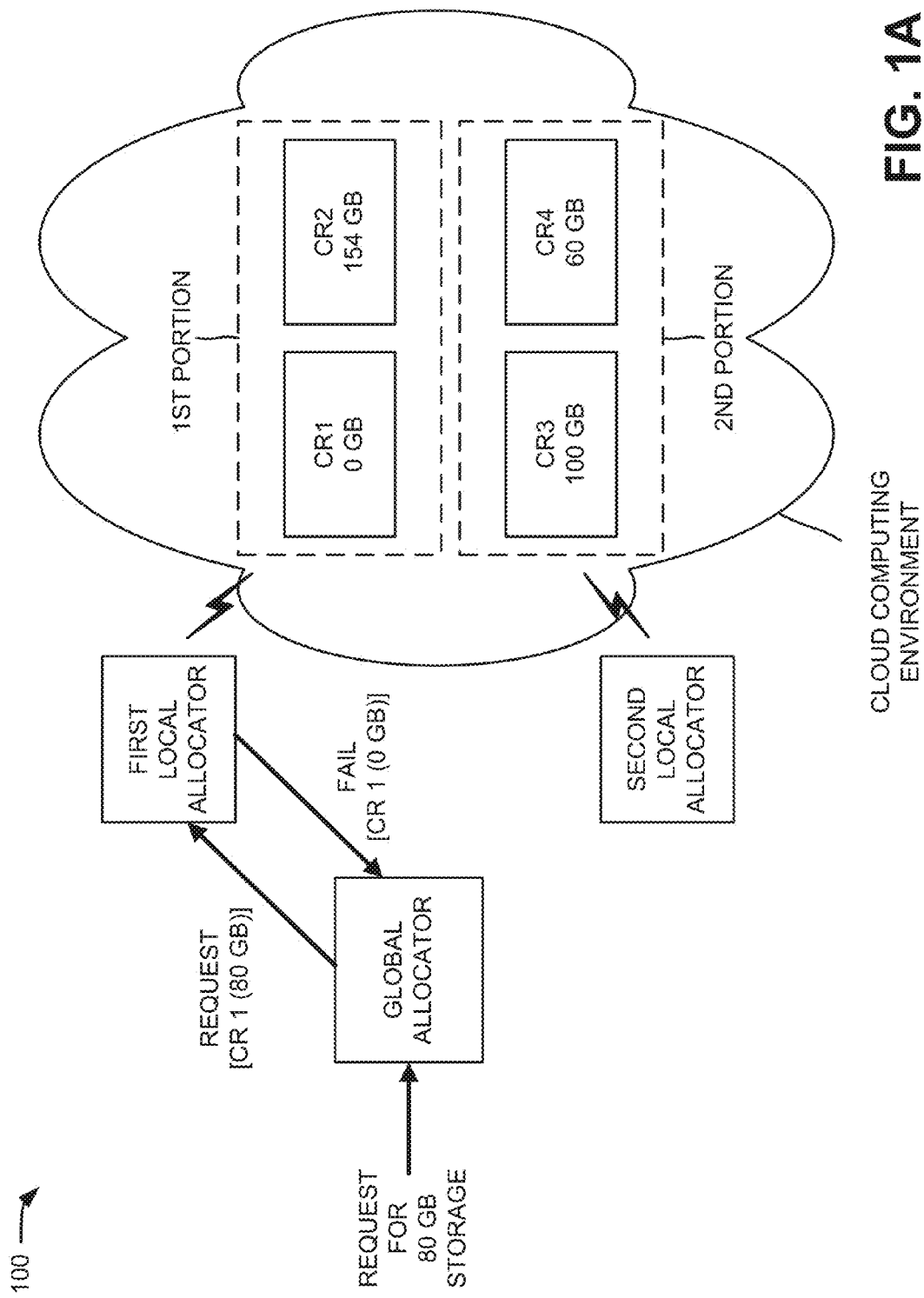

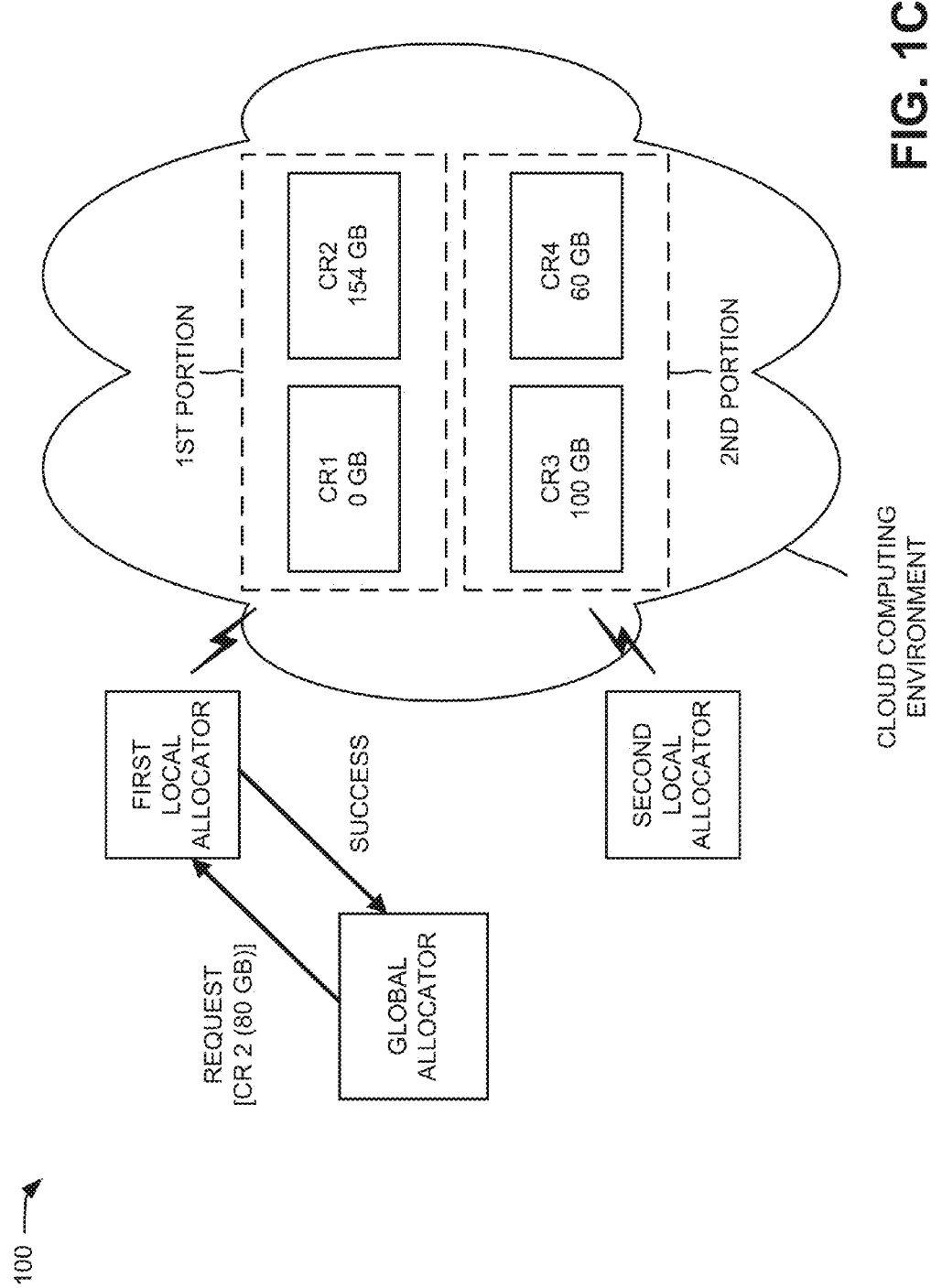

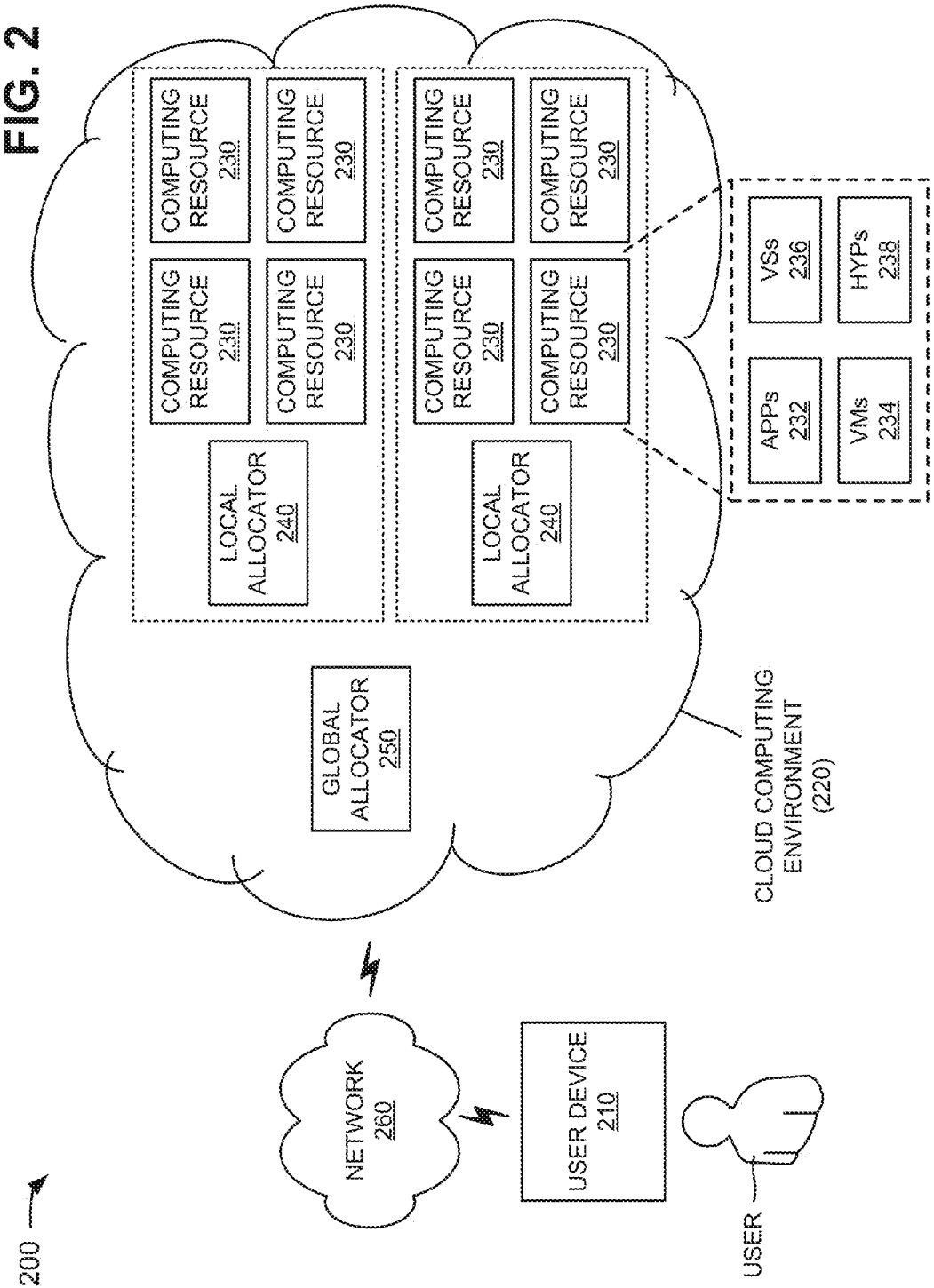

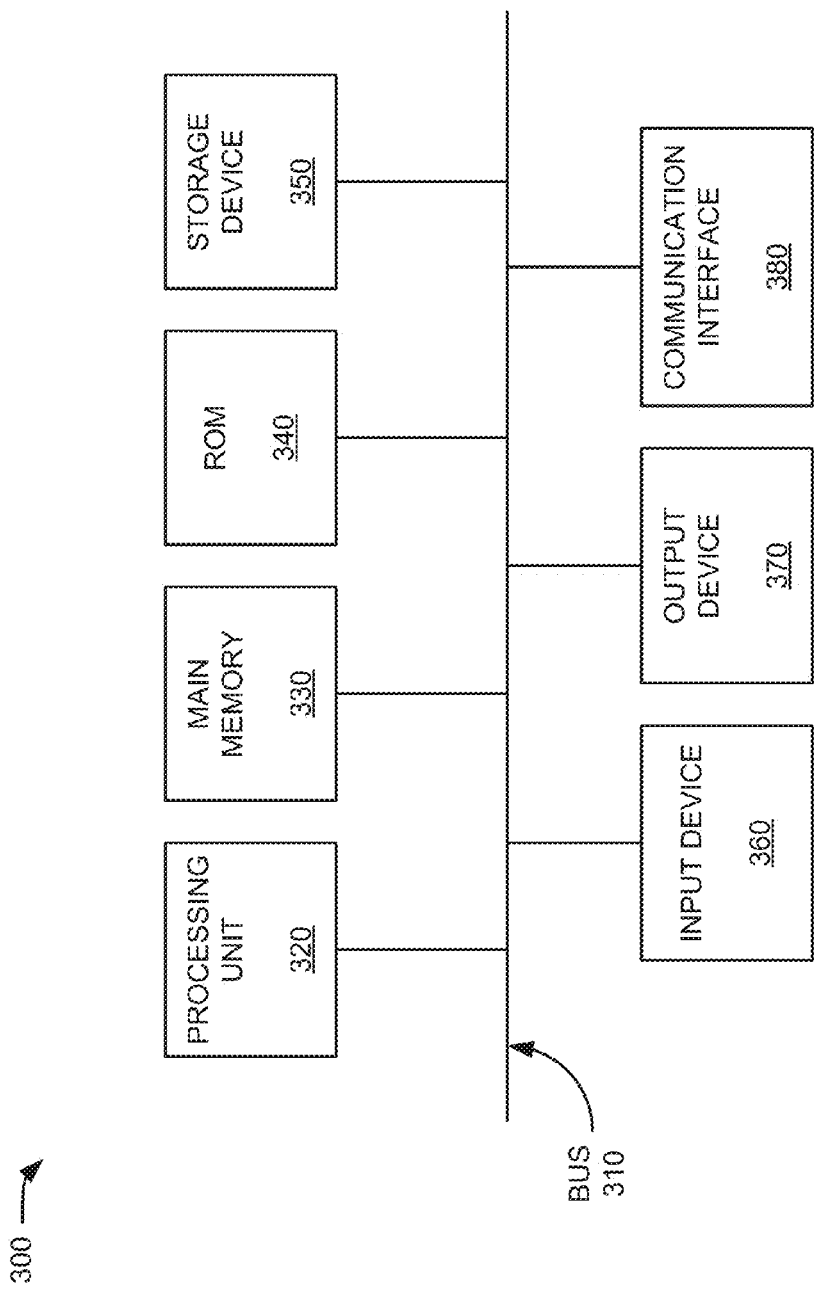

| LOCAL ALLOCATOR ID FIELD 510 | CLOUD RESOURCE ID FIELD 520 | RESOURCE FIELD 530 | REMAINING RESOURCES FIELD 540 |
|---|---|---|---|
| ALLOCATOR1 | CR1 | SERVERS | AMOUNT |
| | | STORAGE | 30 GB |
| | | VMs | AMOUNT |
| ALLOCATOR1 | CR2 | SERVERS | AMOUNT |
| | | STORAGE | AMOUNT |
| | | VMs | AMOUNT |
| ... | | | |

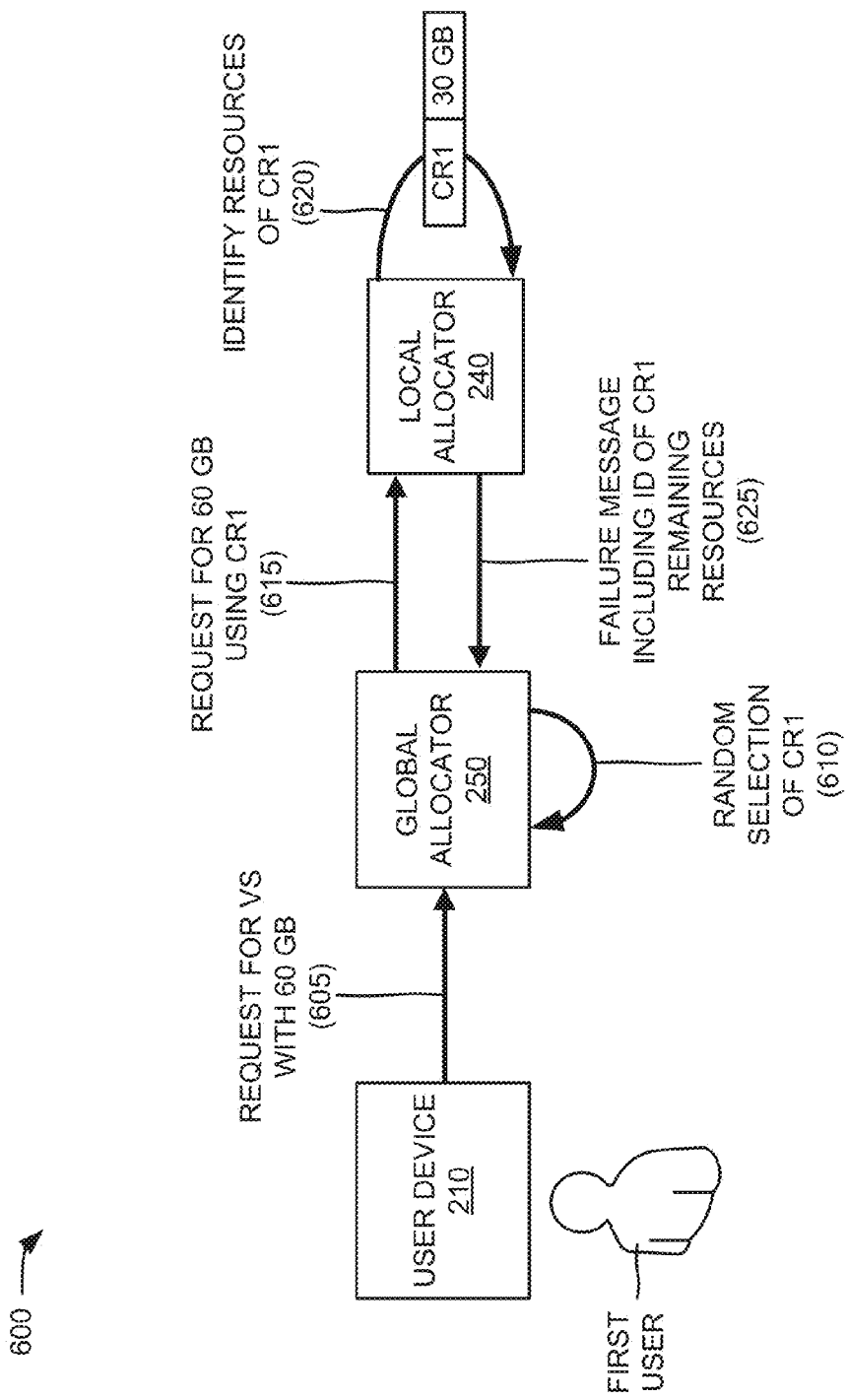

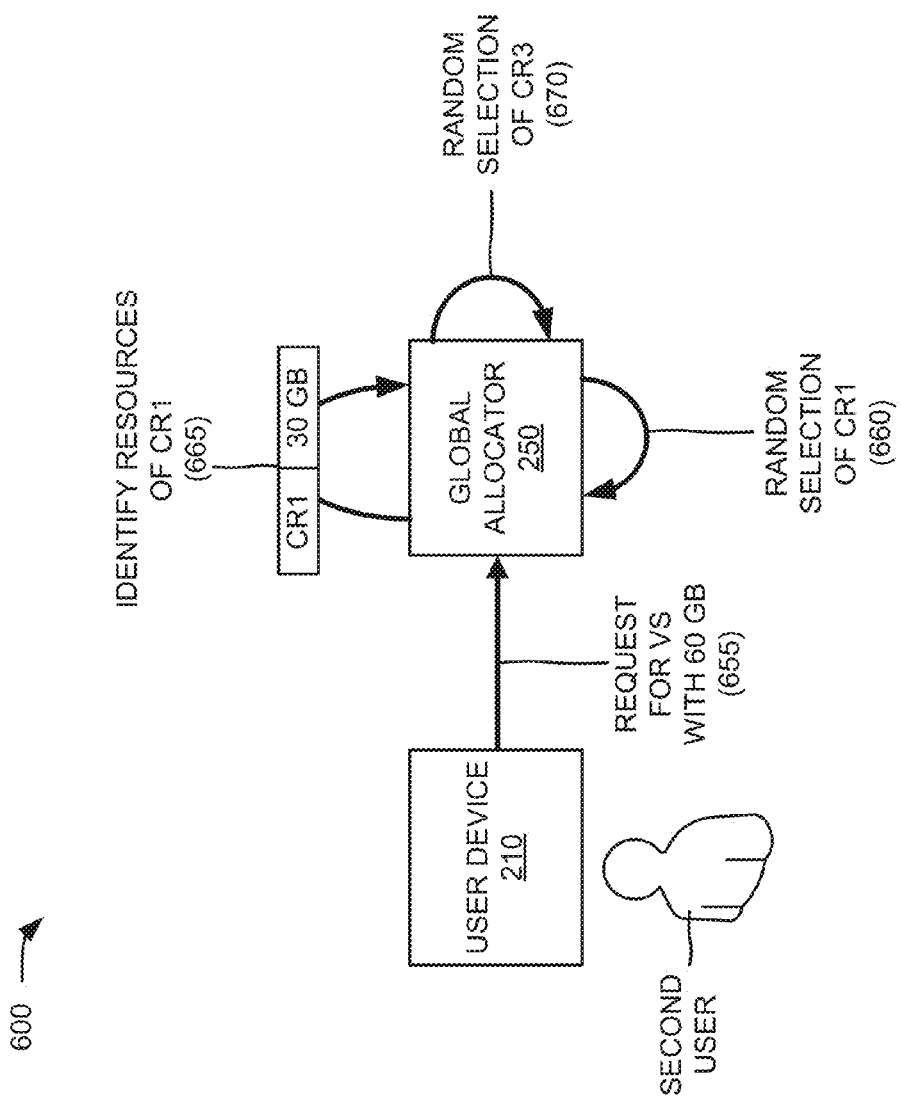

GLOBAL CLOUD COMPUTING ENVIRONMENT RESOURCE ALLOCATION WITH LOCAL OPTIMIZATION

BACKGROUND

Cloud computing is the use of computing resources (e.g., hardware, software, storage, computing power, etc.) which are available from a remote location and accessible over a network, such as the Internet. Cloud computing environments deliver the computing resources as a service rather than as a product, whereby shared computing resources are provided to user devices (e.g., computers, smart phones, etc.). Users may buy these computing resources and use the computing resources on an on-demand basis. Cloud computing environments provide services that do not require end-user knowledge of a physical location and configuration of a system that delivers the services.

The computing resources may include virtual machines (VMs) that provide software implementations of a machine and execute programs like a physical machine. The VMs may provide cloud computing services to the users. One or more users may create one or more VMs in the cloud computing environment. The users may also delete one or more VMs in the cloud computing environment. However, since a cloud computing environment is a highly distributed infrastructure, it may be difficult to efficiently allocate such computing resources in the cloud computing environment.

BRIEF DESCRIPTION OF THE DRAWINGS

FIGS. 1A-1C are diagrams of an overview of example implementations described herein;

FIG. 2 is a diagram of an example environment in which systems and/or methods described herein may be implemented;

FIG. 3 is a diagram of example components of one or more of the devices of the environment depicted in FIG. 2;

FIG. 5 is a diagram of an example data structure that may be used to allocate resources in a cloud computing environment; and FIGS. 6A-6D are diagrams of an example of the process described in connection with FIG. 4.

DETAILED DESCRIPTION OF PREFERRED EMBODIMENTS

The following detailed description refers to the accompanying drawings. The same reference numbers in different drawings may identify the same or similar elements.

Systems and/or methods described herein may provide a two-level resource allocator that includes a top-level (global) allocator and a lower-level (local) allocator for allocating resources in a cloud computing environment. The global allocator may receive general information associated with local resource placement in the cloud computing environment, and may generate an estimate as to where to place a resource in the cloud computing environment. The global allocator may provide the estimate to the local allocator. Since the local allocator has access to detailed information associated with local resource placement, the local allocator may determine whether the estimate provides an appropriate location for the resource. If the estimate does not provide an appropriate location for the resource, the local allocator may provide a fail message (e.g., with the detailed information) to the global allocator. The global allocator may then generate another estimate as to where to place the resource in the cloud computing environment. This process may continue until an appropriate location is determined for the resource, and the resource may be placed at the appropriate location.

Figure 1B:
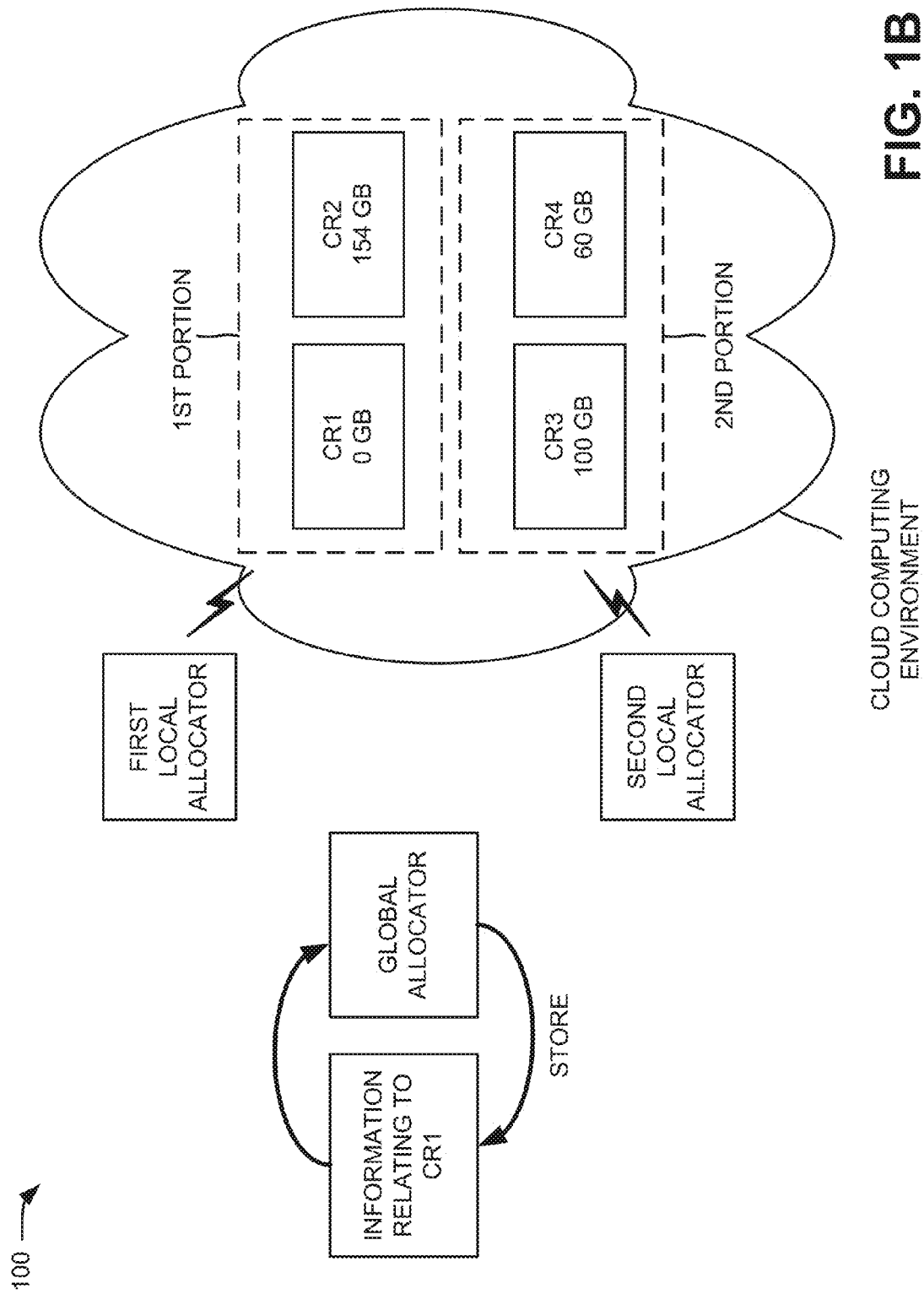

FIGS. 1A-1C are diagrams of an overview of example implementations described herein. For the overview, assume that a cloud computing environment includes a global allocator and local allocators, as shown in FIG. 1A. The global allocator may include one or more devices that determine allocations of computing resources (CRs) for the entire cloud computing environment. The global allocator may store general information associated with the computing resources in the cloud computing environment. The local allocator may include one or more devices that determine allocations of computing resources for a local portion of the cloud computing environment. For example, a first local allocator may determine resource allocations for a first portion of the cloud computing environment, and a second local allocator may determine resource allocations for a second portion of the cloud computing environment. The local allocators may include detailed information associated with computing resources in the corresponding local portions of the cloud computing environment.

As further shown in FIG. 1A, the first portion of the cloud computing environment may include a first computing resource (CR1) and a second computing resource (CR2). Assume that the first computing resource provides zero (0) gigabytes (GB) of storage and that the second computing resource provides one-hundred and fifty-four (154) GB of storage. The second portion of the cloud computing environment may include a third computing resource (CR3) and a fourth computing resource (CR4). Assume that the third computing resource provides one-hundred (100) GB of storage and that the fourth computing resource provides sixty (60) GB of storage.

As further shown FIG. 1A, the global allocator may receive a request for eighty (80) GB of storage from a user (e.g., via a user device) of the cloud computing environment. The global allocator may select a computing resource of a portion of the cloud computing environment based on the request and utilizing random selection, round robin selection, or some other selection technique. Additionally, the global allocator may determine to which local allocator to send the request based on stored (e.g., in cache memory) resource availability that has been collected from messages provided between the local allocators and the global allocator. The global allocator may route requests to a local allocator that is most likely to succeed (e.g., based on the resource availability information periodically received from the local allocators). For example, assume that the global allocator selects the first computing resource and the first local allocator. The global allocator may send the request, along with information identifying the first computing resource, to the first local allocator.

The first local allocator may receive the request, and may determine, based on the detailed information associated with the first computing resource, whether the first computing resource can satisfy the request. Since the first computing resource has zero GB of storage, the first local allocator may determine that the request for eighty GB of storage cannot be satisfied. Based on this determination, the first local allocator may send a message, to global allocator, indicating that the request failed and identifying an amount of resources (e.g., 0 GB of storage) available in the first computing resource.

The global allocator may receive the message, and may store the identified amount of resources with information relating to the first computing resource, as shown in FIG. 1B. The global allocator may select a next computing resource of the first portion of the cloud computing environment based on the stored information. For example, assume that the global allocator selects the second computing resource. The global allocator may send the request, along with information identifying the second computing resource, to the first local allocator, as shown in FIG. 1C.

The first local allocator may receive the request, and may determine, based on the detailed information associated with the second computing resource, whether the second computing resource can satisfy the request. Since the second computing resource has one-hundred and fifty-four GB of storage, the first local allocator may determine that the request for eighty GB of storage can be satisfied. Based on this determination, the first local allocator may allocate eighty GB of storage in the second computing resource to be utilized by the user. The first local allocator may send a message, to global allocator, indicating that the request was successful and that eighty GB of storage have been allocated for the user, as further shown in FIG. 1C. The global allocator may receive the message, and may provide the message to the user (e.g., via the user device).

If the global allocator provides the request for eighty GB of storage to the second local allocator, the second local allocator may provide a message, to the global allocator, indicating that the third computing resource can satisfy the request since the third computing resource has one-hundred GB of storage. Alternatively, the second local allocator may provide a message, to the global allocator, indicating that the fourth computing resource cannot satisfy the request since the fourth computing resource has sixty GB of storage.

Such an arrangement may enable estimated global allocations of resources in a cloud computing environment to be locally optimized so that future estimated global allocation requests may be more accurate. The global resource allocations may be provided to the entire cloud computing environment, and may be locally optimized to portions of the cloud computing environment.

FIG. 2 is a diagram of an example environment 200 in which systems and/or methods described herein may be implemented. As illustrated, environment 200 may include a user device 210 interconnected with a cloud computing environment 220 via a network 260. Components of environment 200 may interconnect via wired connections, wireless connections, or a combination of wired and wireless connections.

User device 210 may include one or more devices that are capable of communicating with cloud computing environment 220 via network 260. For example, user device 210 may include a laptop computer, a personal computer, a tablet computer, a desktop computer, a workstation computer, a smart phone, a personal digital assistant (PDA), and/or another computation or communication device. In some implementations, user device 210 may be associated with a user that receives services from cloud computing environment 220.

Cloud computing environment 220 may include an environment that delivers computing as a service, whereby shared resources, services, etc. may be provided to user device 210. Cloud computing environment 220 may provide computation, software, data access, storage, etc. services that do not require end-user (e.g., user device 210) knowledge of a physical location and configuration of system(s) and/or device(s) that deliver the services.

As shown, cloud computing environment 220 may include a group of computing resources 230 (referred to collectively as computing resources 230 and individually as computing resource 230), one or more local allocators 240, and a global allocator 250. Each local allocator 240 may be associated with a portion of cloud computing environment 220 that includes one or more computing resources 230.

Computing resource 230 may include one or more personal computers, workstation computers, server devices, or other types of computation and communication devices. In some implementations, computing resource 230 may provide services to user device 210. The cloud resources may include compute instances executing in computing resource 230, storage devices provided in computing resource 230, data transfer operations executed by computing resource 230, etc. In some implementations, computing resource 230 may communicate with other computing resources 230 via wired connections, wireless connections, or a combination of wired and wireless connections.

As further shown in FIG. 2, computing resource 230 may include one or more applications (APPs) 232, one or more virtual machines (VMs) 234, virtualized storage (VS) 236, one or more hypervisors (HYPs) 238, etc.

Application 232 may include one or more software applications that may be provided to or accessed by user device 210. Application 232 may eliminate a need to install and execute the software applications on user device 210. For example, application 232 may include word processing software, database software, monitoring software, financial software, communication software, and/or any other software capable of being provided via cloud computing environment 220. In some implementations, one application 232 may send/receive information to/from one or more other applications 232, via virtual machine 234.

Virtual machine 234 may include a software implementation of a machine (e.g., a computer) that executes programs like a physical machine. Virtual machine 234 may be either a system virtual machine or a process virtual machine, depending upon use and degree of correspondence to any real machine by virtual machine 234. A system virtual machine may provide a complete system platform that supports execution of a complete operating system (OS). A process virtual machine may execute a single program, and may support a single process. In some implementations, virtual machine 234 may execute on behalf of a user (e.g., user device 210), and may manage infrastructure of cloud computing environment 220, such as data management, synchronization, and long-duration data transfers.

Virtualized storage 236 may include one or more storage systems and/or one or more devices that use virtualization techniques to enable better functionality and more advanced features within the storage systems or devices of computing resource 230. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system greater flexibility in how they manage storage for end users. File virtualization may eliminate dependencies between data accessed at a file level and a location where files are physically stored. This may enable optimization of storage use, server consolidation, and/or performance of non-disruptive file migrations.

Hypervisor 238 may provide hardware virtualization techniques that allow multiple operating systems (e.g., "guest operating systems") to execute concurrently on a host computer, such as computing resource 230. Hypervisor 238 may present a virtual operating platform to the guest operating systems, and may manage the execution of the guest operating systems. Multiple instances of a variety of operating systems may share virtualized hardware resources. Hypervisor 238 may provide an interface to infrastructure as a service (IaaS) provided by cloud computing environment 220.

Local allocator 240 may include one or more computing resources 230 or one or more computation and communication devices separate from computing resources 230. Local allocator 240 may determine allocations of computing resources 230 for a local portion of cloud computing environment 220. For example, one local allocator 240 may determine allocations for a first set of computing resources 230, and another local allocator 240 may determine allocations for a second set of computing resources 230. Local allocators 240 may include detailed information associated with computing resources 230 in the corresponding local portions of cloud computing environment 220.

Global allocator 250 may include one or more computing resources 230 or one or more computation and communication devices separate from computing resources 230. Global allocator 250 may determine allocations of computing resources 230 for the entire cloud computing environment 220. Global allocator 250 may store general information associated with computing resources 230 in cloud computing environment 220, and may utilize the general information to generate an estimate as to where to place a resource in cloud computing environment 220.

Network 260 may include a network, such as a local area network (LAN), a wide area network (WAN), a metropolitan area network (MAN), a telephone network, such as the Public Switched Telephone Network (PSTN) or a cellular network, an intranet, the Internet, or a combination of networks.

Although FIG. 2 shows example components of environment 200, in some implementations, environment 200 may include fewer components, different components, differently arranged components, or additional components than those depicted in FIG. 2. Alternatively, or additionally, one or more components of environment 200 may perform one or more tasks described as being performed by one or more other components of environment 200.

FIG. 3 is an example diagram of a device 300 that may correspond to one or more of the devices of environment 200. Each of the devices of environment 200 may include one or more devices 300 and/or one or more components of device 300. As illustrated, device 300 may include a bus 310, a processing unit 320, a main memory 330, a read-only memory (ROM) 340, a storage device 350, an input device 360, an output device 370, and/or a communication interface 380. Bus 310 may include a path that permits communication among the components of device 300.

Processing unit 320 may include one or more processors, microprocessors, application-specific integrated circuits (ASICs), field-programmable gate arrays (FPGAs), or other types of processing units that may interpret and execute instructions. Main memory 330 may include one or more random access memories (RAMs) or other types of dynamic storage devices that may store information and/or instructions for execution by processing unit 320. ROM 340 may include one or more ROM devices or other types of static storage devices that may store static information and/or instructions for use by processing unit 320. Storage device 350 may include a magnetic and/or optical recording medium and its corresponding drive, or a removable memory, such as a flash drive.

Input device 360 may include a component that permits a user to input information to device 300, such as a keyboard, a camera, an accelerometer, a gyroscope, a mouse, a pen, a microphone, voice recognition and/or biometric mechanisms, a remote control, a touch screen, a neural interface, etc. Output device 370 may include a component that outputs information to the user, including a display, a printer, a speaker, etc. Communication interface 380 may include any transceiver-like component that enables device 300 to communicate with other devices, networks, and/or systems. For example, communication interface 380 may include components for communicating with another device or system via a network.

As described herein, device 300 may perform certain operations in response to processing unit 320 executing software instructions contained in a computer-readable medium, such as main memory 330. A computer-readable medium may be defined as a non-transitory memory device. A memory device may include space within a single physical memory device or spread across multiple physical memory devices. The software instructions may be read into main memory 330 from another computer-readable medium, such as storage device 350, or from another device via communication interface 380. The software instructions contained in main memory 330 may cause processing unit 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows example components of device 300, in some implementations, device 300 may include fewer components, different components, differently arranged components, or additional components than depicted in FIG. 3. Alternatively, or additionally, one or more components of device 300 may perform one or more tasks described as being performed by one or more other components of device 300.

Figure 4A:
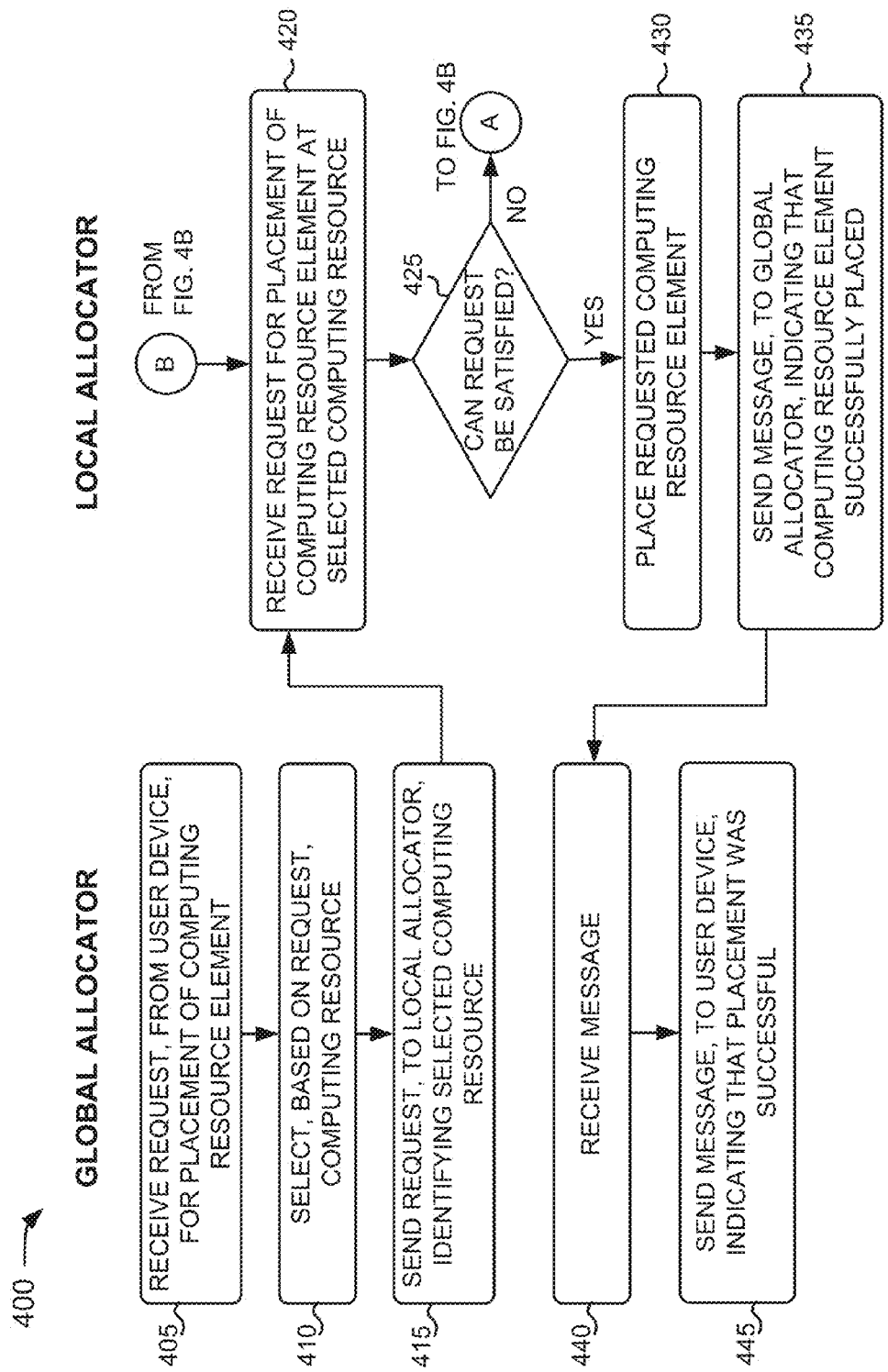
FIGS. 4A and 4B are a flow chart of an example process for allocating resources in a cloud computing environment.
Figure 4B:
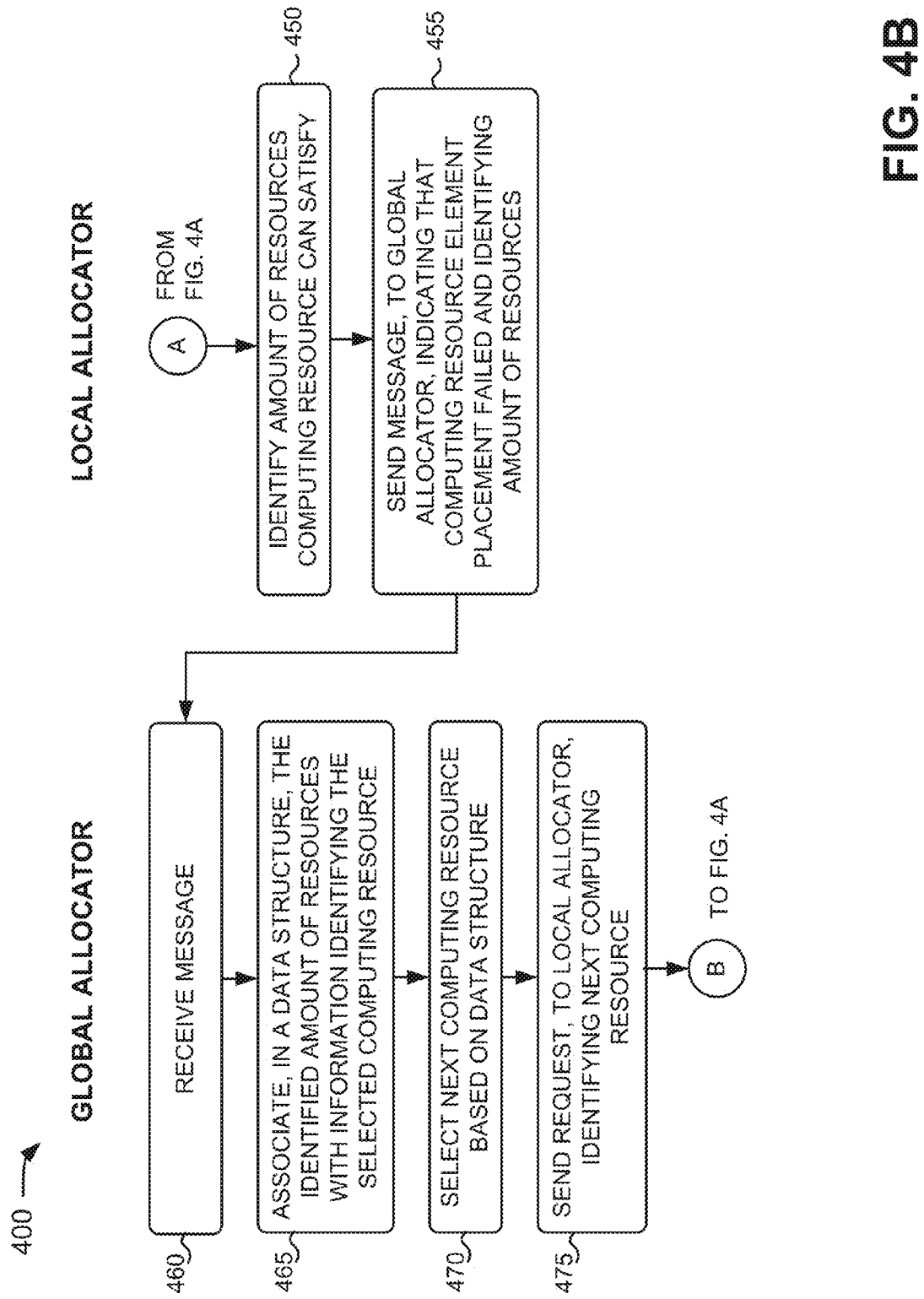

FIGS. 4A and 4B are a flow chart of an example process 400 for allocating resources in a cloud computing environment. In some implementations, process 400 may be performed by local allocator 240 and global allocator 250. In some implementations, process 400 may be performed by another device or a group of devices separate from or including local allocator 240 and global allocator 250.

As shown in FIG. 4A, process 400 may include receiving a request, from a user device, for placement of a computing resource element (block 405). For example, a user associated with user device 210 may wish to utilize virtualized storage 236 in cloud computing environment 220. The user may utilize user device 210 to provide a request for placement of a computing resource element (e.g., virtualized storage 236) to global allocator 250. Global allocator 250 may receive the request from user device 210. In some implementations, the request may be automatically generated by global allocator 250 when global allocator 250 determines that a new computing resource element (e.g., a VM 234, virtualized storage 236, etc.) is needed for cloud computing environment 220. For example, a database application provided by cloud computing environment 220 may require additional storage since the database has increased in size. In such a situation, global allocator 250 may generate a request for new virtualized storage 236 for the database application. In some implementations, the request may be provided by a system administrator associated with cloud computing environment 220.

As further shown in FIG. 4A, process 400 may include selecting, based on the request, a computing resource of the cloud computing environment (block 410). For example, global allocator 250 may select, based on the request, one or more computing resources 230 from cloud computing environment 220 for placement of the computing resource element. In some implementations, global allocator 250 may select computing resource(s) 230 utilizing a selection technique, such as, for example, a random selection technique, a round robin selection technique, a weighted round robin selection technique, or some other selection technique. In some implementations, global allocator 250 may select computing resource(s) 230 based on capabilities associated with computing resource(s) 230 (e.g., processing capabilities, storage capabilities, bandwidth capabilities, etc.).

As shown in FIG. 4A, process 400 may include sending a request, to a local allocator, identifying the selected computing resource (block 415). For example, global allocator 250 may provide, to local allocator 240, a request that identifies the selected computing resource(s) 230 and the computing resource element (e.g., virtualized storage 236) to be provided by the selected computing resource(s) 230. In some implementations, the request may include information requesting placement of the computing resource element at the selected computing resource(s) 230.

As further shown in FIG. 4A, process 400 may include receiving the request for placement of the computing resource element at the selected computing resource (block 420). For example, local allocator 240 may receive, from global allocator 250, the request for placement of the computing resource element at the selected computing resource(s) 230.

As shown in FIG. 4A, process 400 may include determining whether the request can be satisfied (block 425). For example, local allocator 240 may determine whether the computing resource element (e.g., virtualized storage 236) can be provided by the selected computing resource(s) 230. In some implementations, local allocator 240 may make this determination based on processing capabilities, storage capabilities, bandwidth capabilities, etc. associated with computing resource(s) 230. In some implementations, local allocator 240 may store detailed information associated with computing resources 230 in a corresponding local portion of cloud computing environment 220. Local allocator 240 may determine whether the computing resource element can be provided by the selected computing resource(s) 230 based on the detailed information stored by local allocator 240.

As further shown in FIG. 4A, if the request can be satisfied (block 425—YES), process 400 may include placing the requested computing resource element in the selected computing resource (block 430). For example, local allocator 240 may determine that the computing resource element (e.g., virtualized storage 236) can be provided by the selected computing resource(s) 230 when the selected computing resource(s) 230 include capabilities (e.g., storage capabilities) to handle the computing resource element. Based on this determination, local allocator 240 may provision the selected computing resource(s) 230 to provide the computing resource element (e.g., virtualized storage 236).

As shown in FIG. 4A, process 400 may include sending a message, to the global allocator, indicating that the computing resource element has been successfully placed (block 435). For example, after local allocator 240 provisions the selected computing resource(s) 230 to provide the computing resource element, local allocator 240 may generate a message indicating that the computing resource element has been provisioned in the selected computing resource(s) 230. Local allocator 240 may provide the message to global allocator 250.

As further shown in FIG. 4A, process 400 may include receiving the message (block 440). For example, global allocator 250 may receive, from local allocator 240, the message indicating that the computing resource element has been provisioned in the selected computing resource(s) 230. In some implementations, global allocator 250 may display the message to the system administrator associated with cloud computing environment 220.

As also shown in FIG. 4A, process 400 may include sending the message, to the user device, indicating that the computing resource element has been successfully placed (block 445). For example, if the request (block 405) is received from user device 210, global allocator 250 may provide, to user device 210, the message indicating that the computing resource element has been provisioned in the selected computing resource(s) 230. In some implementations, user device 210 may display the message to the user associated with user device 210.

As further shown in FIGS. 4A and 4B, if the request cannot be satisfied (block 425—NO), process 400 may include identifying an amount of resources that the selected computing resource can satisfy (block 450). For example, local allocator 240 may determine that the computing resource element (e.g., virtualized storage 236) cannot be provided by the selected computing resource(s) 230 when the selected computing resource(s) 230 do not have capabilities (e.g., storage capabilities) to handle the computing resource element. For example, if the selected computing resource(s) 230 include thirty GB of storage and virtualized storage 236 requires fifty GB of storage, local allocator 240 may determine that virtualized storage 236 cannot be provided by the selected computing resource(s) 230. Based on this determination, local allocator 240 may identify the capabilities (e.g., the amount of resources) that the selected computing resource(s) 230 can satisfy. For example, local allocator 240 may identify that the selected computing resource(s) 230 include thirty GB of storage.

As shown in FIG. 4B, process 400 may include sending a message, to the global allocator, indicating that computing resource placement failed and identifying the amount of resources that the selected computing resource can satisfy (block 455). For example, local allocator 240 may generate a message indicating that provision of the computing resource element (e.g., virtualized storage 236) in the selected computing resource(s) 230 failed. The message may also include the amount of resources that the selected computing resource(s) 230 can satisfy. For example, local allocator 240 may generate a message indicating that the selected computing resource(s) 230 include thirty GB of storage. Local allocator 240 may provide the message to global allocator 250.

As further shown in FIG. 4B, process 400 may include receiving the message (block 460). For example, global allocator 250 may receive, from local allocator 240, the message indicating that provision of the computing resource element (e.g., virtualized storage 236) in the selected computing resource(s) 230 failed and identifying the amount resources that the selected computing resource(s) 230 can satisfy. In some implementations, global allocator 250 may display the message to the system administrator associated with cloud computing environment 220.

As shown in FIG. 4B, process 400 may include associating, in a data structure, the identified amount of resources with information identifying the selected computing resource (block 465). For example, global allocator 250 may be associated with a data structure 500, as shown in FIG. 5. Data structure 500 may include a database, a table, a list, an array, etc. As further shown in FIG. 5, data structure 500 may include a table with a local allocator identifier (ID) field 510, a cloud resource field 520, a resource field 530, a remaining resources field 540, and multiple entries associated with fields 510-540. In some implementations, data structure 500 may include a different type of data structure, different fields, additional fields, and/or differently arranged fields.

Local allocator ID field 510 may include identifiers for local allocators 240 provided in cloud computing environment 220. For example, a first local allocator 240, associated with a first portion of cloud computing environment 220, may include a first identifier (e.g., ALLOCATOR1); a second local allocator 240, associated with a second portion of cloud computing environment 220, may include a second identifier (e.g., ALLOCATOR2); etc.

Cloud resource ID field 520 may include identifiers for computing resources 230 provided in the portions of cloud computing environment 220 associated with local allocators 240 identified in local allocator ID field 510. For example, a first computing resource may include a first identifier (e.g., CR1) and may be associated the first local allocator 240 (e.g., ALLOCATOR1); a second computing resource may include a second identifier (e.g., CR2) and may be associated the second local allocator 240 (e.g., ALLOCATOR2); etc.

Resource field 530 may include information identifying resources provide by computing resources identified in cloud resource ID field 520. For example, the first computing resource (e.g., CR1) may include servers, storage, and VMs (e.g., as identified in resource field 530); the second computing resource (e.g., CR2) may include servers, storage, and VMs (e.g., as identified in resource field 530); etc.

Remaining resources field 540 may include information identifying an amount of resources remaining for the resources identified in resource field 530. For example, the servers and VMs provided in the first computing resource (e.g., CR1) may include amounts of remaining resources; the servers, storage, and VMs in the second computing resource (e.g., CR2) may include amounts of remaining resources; etc.

In some implementations, global allocator 250 may associate, in data structure 500, the identified amount of resources with information identifying the selected computing resource. For example, global allocator 250 may provide the identified amount of resources (e.g., thirty GB of storage) in remaining resources field 540 of data structure 500. This may indicate that the storage of the first computing resource (e.g., CR1) includes thirty GB of memory remaining.

Returning to FIG. 4B, process 400 may include selecting a next computing resource based on the data structure (block 470). For example, global allocator 250 may select, based on the information provided in data structure 500, a next computing resource 230 for placement of the computing resource element. In some implementations, global allocator 250 may select the next computing resource 230 utilizing a selection technique, such as, for example, a random selection technique, a round robin selection technique, a weighted round robin selection technique, or some other selection technique. In some implementations, global allocator 250 may select the next computing resource 230 based on capabilities associated with the next computing resource 230 (e.g., processing capabilities, storage capabilities, bandwidth capabilities, etc.). In some implementations, subsequent requests for placement of computing resource elements may start at block 470.

As further shown in FIG. 4B, process 400 may include sending a request, to the local allocator, identifying the next computing resource (block 455). For example, global allocator 250 may provide, to local allocator 240, a request that identifies the next computing resource 230 and the computing resource element (e.g., virtualized storage 236) to be provided by the next computing resource 230. In some implementations, the request may include information requesting placement of the computing resource element at the next computing resource 230. In some implementations, process 400 may continue until an appropriate computing resource 230 is determined for the computing resource element, and the computing resource element may be provisioned in the appropriate computing resource 230.

While FIGS. 4A and 4B show process 400 as including a particular quantity and arrangement of blocks, in some implementations, process 400 may include fewer blocks, additional blocks, or a different arrangement of blocks. Additionally, or alternatively, some of the blocks may be performed in parallel. Further, one or more blocks may be omitted in some implementations.

Figure 6B:
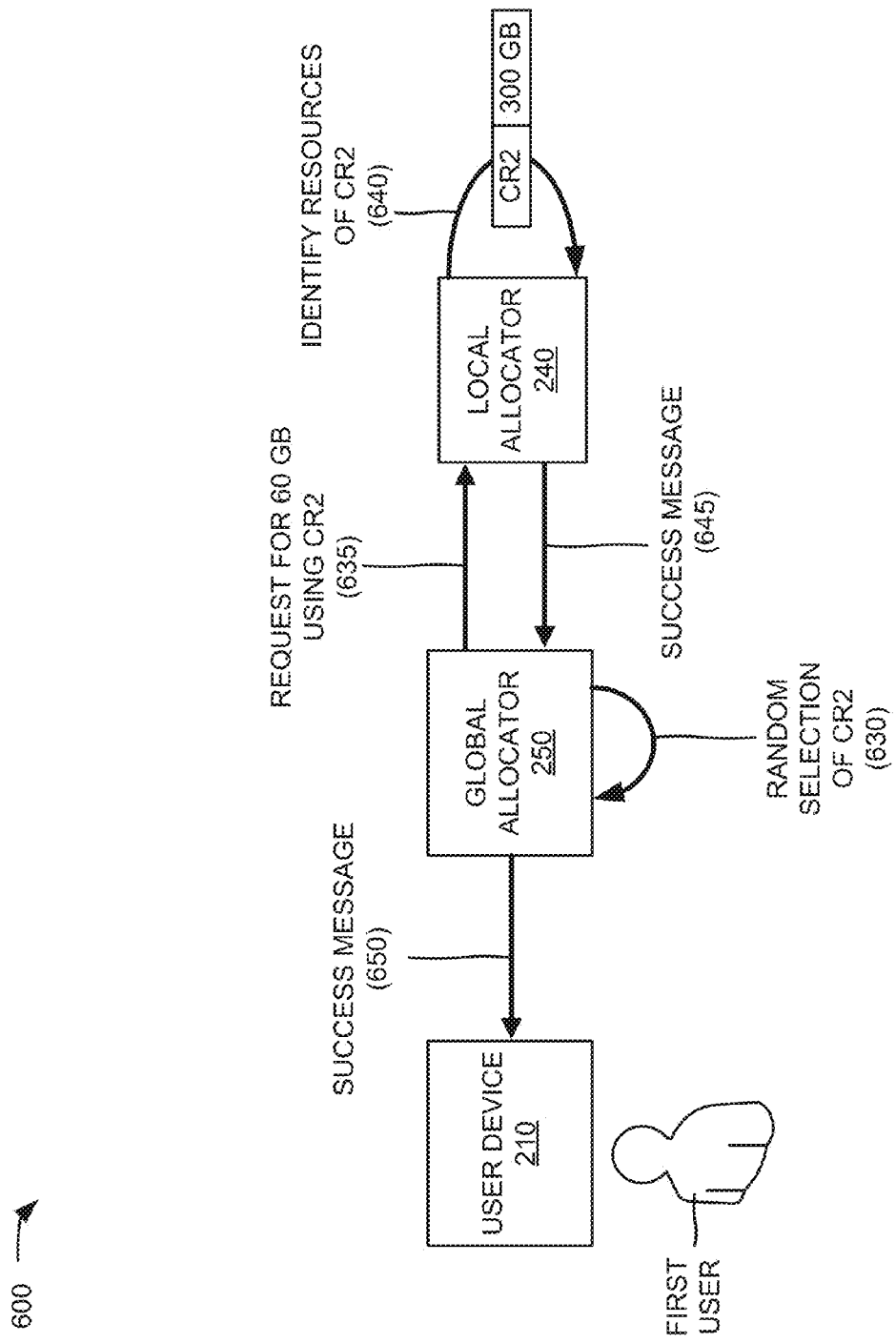
Figure 6D:
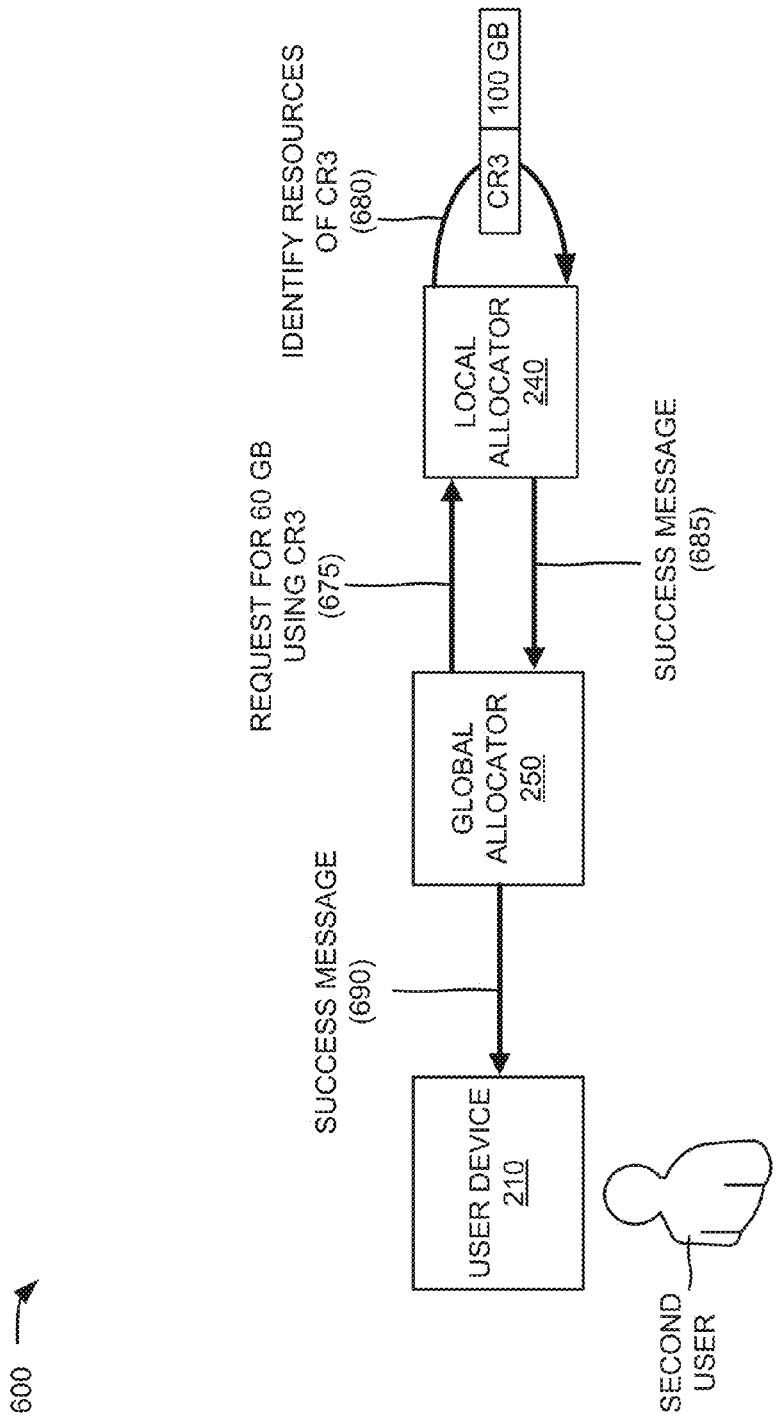

FIGS. 6A-6D are diagrams of an example 600 of the process described above with respect to FIGS. 4A and 4B. In example 600, assume that a first user utilizes user device 210 to generate a request 605 for a particular computing resource element (e.g., virtualized storage 236 with sixty (60) GB), as shown in FIG. 6A. User device 210 may provide request 605 to global allocator 250, and global allocator 250 may receive request 605. Further assume that global allocator 250 randomly selects, based on request 605, a first computing resource (CR1) for placement of the sixty GB of virtualized storage 236, as indicated by reference number 610 in FIG. 6A. After selecting the first computing resource, global allocator 250 may generate a request 615 for placement of the sixty GB of virtualized storage 236 in the first computing resource, and may provide request 615 to local allocator 240.

Local allocator 240 may receive request 615, and may identify resources of the first computing resource based on request 615, as indicated by reference number 620 in FIG. 6A. In example 600, assume that the first computing resource includes thirty GB of storage and that local allocator 240 identifies the thirty GB of storage based on request 615. Since the first computing resource does not have enough storage to accommodate the requested sixty GB of storage, local allocator 240 may generate a failure message 625 indicating that request 615 cannot be satisfied and including an identification of remaining resources (e.g., thirty GB of storage) of the first computing resource. Local allocator 240 may provide failure message 625 to global allocator 250, and global allocator 250 may associate, in a data structure associated with global allocator 250, the identified amount of remaining resources (e.g., thirty GB of storage) with information identifying the first computing resource.

In example 600, further assume that global allocator 250 randomly selects, based on failure message 625, a second computing resource (CR2) for placement of the sixty GB of virtualized storage 236, as indicated by reference number 630 in FIG. 6B. After selecting the second computing resource, global allocator 250 may generate a request 635 for placement of the sixty GB of virtualized storage 236 in the second computing resource, and may provide request 635 to local allocator 240. Local allocator 240 may receive request 635, and may identify resources of the second computing resource based on request 635, as indicated by reference number 640 in FIG. 6B. In example 600, assume that the second computing resource includes three hundred GB of storage and that local allocator 240 identifies the three hundred GB of storage based on request 635.

Since the second computing resource has enough storage to accommodate the requested sixty GB of storage, local allocator 240 may generate a success message 645 indicating that request 635 can be satisfied and including an identification of remaining resources (e.g., two hundred and forty GB of storage) of the second computing resource. Local allocator 240 may provide success message 645 to global allocator 250, and global allocator 250 may associate, in the data structure, the identified amount of remaining resources (e.g., two hundred and forty GB of storage) with information identifying the second computing resource. Global allocator 250 may provide a success message 650 to user device 210, and user device 210 may display success message 650 to the first user. Success message 650 may include information indicating that sixty GB of storage have been allocated to the first user in the second computing resource.

In example 600, now assume that a second user utilizes user device 210 to generate a request 655 for a particular computing resource element (e.g., virtualized storage 236 with sixty GB), as shown in FIG. 6C. User device 210 may provide request 655 to global allocator 250, and global allocator 250 may receive request 655. Further assume that global allocator 250 randomly selects, based on request 655, the first computing resource for placement of the sixty GB of virtualized storage 236, as indicated by reference number 660 in FIG. 6C. However, global allocator 250 may not select the first computing resource since global allocator 250 may know, from the data structure, that the remaining resources (e.g., thirty GB of storage) of the first computing resource cannot satisfy the requested sixty GB of storage, as indicated by reference number 665 in FIG. 6C. Instead, global allocator 250 may randomly select a third computing resource for placement of the sixty GB of virtualized storage 236, as indicated by reference number 670 in FIG. 6C.

After selecting the third computing resource, global allocator 250 may generate a request 675 for placement of the sixty GB of virtualized storage 236 in the third computing resource, and may provide request 675 to local allocator 240. Local allocator 240 may receive request 675, and may identify resources of the third computing resource based on request 675, as indicated by reference number 680 in FIG. 6D. In example 600, assume that the third computing resource includes one hundred GB of storage and that local allocator 240 identifies the one hundred GB of storage based on request 675.

Since the third computing resource has enough storage to accommodate the requested sixty GB of storage, local allocator 240 may generate a success message 685 indicating that request 675 can be satisfied and including an identification of remaining resources (e.g., forty GB of storage) of the third computing resource. Local allocator 240 may provide success message 685 to global allocator 250, and global allocator 250 may associate, in the data structure, the identified amount of remaining resources (e.g., forty GB of storage) with information identifying the third computing resource. Global allocator 250 may provide a success message 690 to user device 210, and user device 210 may display success message 690 to the second user. Success message 690 may include information indicating that sixty GB of storage have been allocated to the second user in the third computing resource.

As indicated above, FIGS. 6A-6D are provided merely as an example. Other examples are possible and may differ from what was described with regard to FIGS. 6A-6D.

Systems and/or methods described herein may provide a two-level resource allocator that includes a top-level (global) allocator and a lower-level (local) allocator for allocating resources in a cloud computing environment. The global allocator may receive general information associated with local resource placement in the cloud computing environment, and may generate an estimate as to where to place a resource in the cloud computing environment. The global allocator may provide the estimate to the local allocator. Since the local allocator has access to detailed information associated with local resource placement, the local allocator may determine whether the estimate provides an appropriate location for the resource. If the estimate does not provide an appropriate location for the resource, the local allocator may provide a fail message (e.g., with the detailed information) to the global allocator. The global allocator may then generate another estimate as to where to place the resource in the cloud computing environment. This process may continue until an appropriate location is determined for the resource, and the resource may be placed at the appropriate location.

To the extent the aforementioned implementations collect, store, or employ personal information provided by individuals, it should be understood that such information shall be used in accordance with all applicable laws concerning protection of personal information. Storage and use of personal information may be in an appropriately secure manner reflective of the type of information, for example, through various encryption and anonymization techniques for particularly sensitive information.

The foregoing description of implementations provides illustration and description, but is not intended to be exhaustive or to limit the implementations to the precise form disclosed. Modifications and variations are possible in light of the above disclosure or may be acquired from practice of the implementations.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the implementations may be implemented as a "component" that performs one or more functions. This component may include hardware, such as a processor, an ASIC, or a FPGA, or a combination of hardware and software.

As used herein, the term "user" is intended to be broadly interpreted to include a user device, or a user of a user device.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A method, comprising:
    receiving, by a device of a cloud computing environment, information associated with one or more computing resources of a local portion of the cloud computing environment;
    receiving, by the device and from a global allocator device, a request for placement of a computing resource element at a selected computing resource of the one or more computing resources,
        the selected computing resource being selected by the global allocator device based on an estimate of the placement of the computing resource element,
            the estimate of the placement of the computer resource element being based on at least one of a random selection technique, a round robin selection technique, or a weighted round robin selection technique,
            the estimate of the placement of the computer resource element being based on a portion of the information associated with the one or more computing resources of the local portion of the cloud computing environment,
                the portion of the information being provided, by the device and to the global allocator device, via prior messages associated with resource availability of the one or more computing resources, and
        the device being selected, from a plurality of local allocator devices, by the global allocator device;
    determining, by the device and based on the information associated with the one or more computing resources, whether the request can be satisfied by the selected computing resource,
        the information associated with the one or more computing resources including information associated with at least one of:
            processing capabilities associated with the one or more computing resources,
            storage capabilities associated with the one or more computing resources, or
            bandwidth capabilities associated with the one or more computing resources;
    placing, by the device, the requested computing resource element in the selected computing resource when the request can be satisfied by the selected computing resource; and
    sending, by the device and to the global allocator device, a message indicating that the requested computing resource element has been successfully placed in the selected computing resource when the requested computing resource element is placed in the selected computing resource.

2. The method of claim 1, further comprising:
    storing the information, associated with the one or more computing resources of the local portion of the cloud computing environment, in a data structure associated with the device.

3. The method of claim 1, further comprising:
    identifying an amount of resources that can be satisfied by the selected computing resource when the request cannot be satisfied by the selected computing resource.

4. The method of claim 3, further comprising:
    sending, to the global allocator device and when the request cannot be satisfied by the selected computing resource, a failure message indicating that placement of the computing resource element failed and identifying the amount of resources.

5. The method of claim 1, where the device includes a local allocator device associated with the local portion of the cloud computing environment.

6. A device of a cloud computing environment, the device comprising:
    memory to store instructions; and
    one or more processors, to execute the instructions in the memory to:
        receive information associated with one or more computing resources of a local portion of the cloud computing environment,
        receive, from a global allocator device, a request for placement of a computing resource element at a selected computing resource of the one or more computing resources,
            the selected computing resource being selected by the global allocator device based on an estimate of the placement of the computing resource element, the estimate of the placement of the computer resource element being based on at least one of a random selection technique, a round robin selection technique, or a weighted round robin selection technique,
            the estimate of the placement of the computer resource element being based on a portion of the information associated with the one or more computing resources of the local portion of the cloud computing environment,
                the portion of the information being provided, by the device and to the global allocator device, via prior messages associated with resource availability of the one or more computing resources, and
            the device being selected, from a plurality of local allocator devices of the cloud computing environment, by the global allocator device,
        determine, based on the information associated with the one or more computing resources, whether the request can be satisfied by the selected computing resource,
            the information associated with the one or more computing resources including information associated with at least one of:
                processing capabilities associated with the one or more computing resources,
                storage capabilities associated with the one or more computing resources, or
                bandwidth capabilities associated with the one or more computing resources,
        place the requested computing resource element in the selected computing resource when the request can be satisfied by the selected computing resource, and
        send, to the global allocator device and when the requested computing resource element is placed in the selected computing resource, a message indicating that the requested computing resource element has been successfully placed in the selected computing resource.

7. The device of claim 6, where the one or more processors are further to:
store the information, associated with the one or more computing resources of the local portion of the cloud computing environment, in a data structure associated with the device.

8. The device of claim 6, where the one or more processors are further to:
identify an amount of resources that can be satisfied by the selected computing resource when the request cannot be satisfied by the selected computing resource.

9. The device of claim 8, where the one or more processors are further to:
send, to the global allocator device and when the request cannot be satisfied by the selected computing resource, a failure message indicating that placement of the computing resource element failed and identifying the amount of resources.

10. The device of claim 6, where the device includes a local allocator device associated with the local portion of the cloud computing environment.

11. A method, comprising:
receiving, by a device of a cloud computing environment and from a user device, a first request for placement of a computing resource element in the cloud computing environment;
selecting, by the device and based on the first request, a computing resource, of a portion of the cloud computing environment, for the computing resource element based on an estimate of the placement of the computing resource element,
the estimate of the placement of the computer resource element being based on at least one of a random selection technique, a round robin selection technique, or a weighted round robin selection technique,
the estimate of the placement of the computer resource element being based on a portion of information associated with one or more computing resources of the portion of the cloud computing environment,
the portion of the information being received, by the device, via prior messages associated with resource availability of the one or more computing resources;
determining, by the device, that a first local allocator device, associated with the portion of the cloud computing environment, is more likely to succeed in placing the computing resource element in the computing resource than a second local allocator device associated with the portion of the cloud computing environment;
selecting, by the device, the first local allocator device based on determining that the first local allocator device is more likely to succeed in placing the computing resource element in the computing resource than the second local allocator device;
sending, by the device and to the first local allocator device, a second request identifying the computing resource; and
receiving, by the device and from the first local allocator device, a message indicating that the computing resource element has been successfully placed at the computing resource, identified in the second request, when the computing resource can satisfy the first request.

12. The method of claim 11, further comprising:
sending, to the user device, the message indicating successful placement of the computing resource element at the computing resource.

13. The method of claim 11, further comprising:
receiving, from the first local allocator device and when the computing resource cannot satisfy the first request, another message indicating that placement of the computing resource element at the computing resource has failed and identifying an amount of resources at the computing resource.

14. The method of claim 13, further comprising:
associating, in a data structure associated with the device and when the computing resource cannot satisfy the first request, the amount of resources with information identifying the computing resource.

15. The method of claim 14, further comprising:
selecting another computing resource of a local portion of the cloud computing environment based on the data structure; and
sending, to the first local allocator device, a third request identifying the other computing resource.

16. A device of a cloud computing environment, the device comprising:
memory to store instructions; and
one or more processors, to execute the instructions in the memory to:
receive, from a user device, a first request for placement of a computing resource element in the cloud computing environment,
select, based on the first request, a computing resource, of a portion of the cloud computing environment, for the computing resource element, based on an estimate of the placement of the computing resource element,
the estimate of the placement of the computer resource element being based on at least one of a random selection technique, a round robin selection technique, or a weighted round robin selection technique,
the estimate of the placement of the computer resource element being based on a portion of information associated with one or more computing resources of the portion of the cloud computing environment,
the portion of the information being received, by the device, via prior messages associated with resource availability of the one or more computing resources
determine that a first local allocator device, associated with the portion of the cloud computing environment, is more likely to succeed in placing the computing resource element in the computing resource than a second local allocator device associated with the portion of the cloud computing environment;
select the first local allocator device based on determining that the first local allocator device is more likely to succeed in placing the computing resource element in the computing resource than the second local allocator device;
send, to the first local allocator device, a second request identifying the computing resource, and receive, from the first local allocator device, a message indicating that the computing resource element has been successfully placed at the computing resource, identified in the second request, when the computing resource can satisfy the first request.

17. The device of claim 16, where the one or more processors are further to:

send, to the user device, the message indicating successful placement of the computing resource element at the computing resource.

18. The device of claim 16, where the one or more processors are further to:
receive, from the first local allocator device and when the computing resource cannot satisfy the first request, another message indicating that placement of the computing resource element at the computing resource has failed and identifying an amount of resources at the computing resource.

19. The device of claim 18, where the one or more processors are further to:
associate, in a data structure associated with the device and when the computing resource cannot satisfy the first request, the identified amount of resources with information identifying the computing resource.

20. The device of claim 19, where the one or more processors are further to:
select another computing resource of the portion of the cloud computing environment based on the data structure, and
send, to the first local allocator device, a third request identifying the other computing resource.

* * * * *